United States Patent
Yoshikawa et al.

(10) Patent No.: US 7,853,879 B2
(45) Date of Patent: Dec. 14, 2010

(54) IMAGE DISPLAY APPARATUS AND METHOD

(75) Inventors: Tomoyasu Yoshikawa, Atsugi (JP);
Shuntaro Aratani, Machida (JP);
Tomoyuki Ohno, Zama (JP); Katsuhiro Miyamoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1132 days.

(21) Appl. No.: 11/470,396

(22) Filed: Sep. 6, 2006

(65) Prior Publication Data

US 2007/0097265 A1 May 3, 2007

(30) Foreign Application Priority Data

Sep. 12, 2005 (JP) .............................. 2005-264435

(51) Int. Cl.
*G06F 3/16* (2006.01)
(52) U.S. Cl. ................... 715/716; 715/200; 715/270; 715/271; 345/30; 348/206; 348/143
(58) Field of Classification Search ......... 715/200–277, 715/716; 700/701–799, 800–866; 345/30–111, 345/629, 690, 781; 348/206–231.9, 445, 348/143; 386/200–242; 463/20; 717/173; 198/411; 370/400
See application file for complete search history.

(56) References Cited

U.S. PATENT DOCUMENTS

| 5,774,105 | A | 6/1998 | Yamamoto et al. ............ 345/97 |
| 6,473,088 | B1 | 10/2002 | Matsumoto et al. ......... 345/530 |
| 6,538,675 | B2 | 3/2003 | Aratani et al. ............... 345/856 |
| 6,614,439 | B2 | 9/2003 | Matsumoto et al. ......... 345/530 |
| 7,716,662 | B2 * | 5/2010 | Seiden ........................ 717/173 |
| 2003/0063125 | A1 * | 4/2003 | Miyajima et al. ........... 345/781 |
| 2003/0076312 | A1 | 4/2003 | Yokoyama |
| 2004/0001696 | A1 | 1/2004 | Kogusuri |
| 2004/0136689 | A1 * | 7/2004 | Oka ............................ 386/52 |
| 2004/0162133 | A1 * | 8/2004 | Jackson ....................... 463/20 |
| 2005/0040999 | A1 * | 2/2005 | Numano ..................... 345/1.1 |
| 2007/0126757 | A1 * | 6/2007 | Itoh et al. ................... 345/690 |
| 2007/0152934 | A1 * | 7/2007 | Maeda ........................ 345/92 |
| 2008/0190737 | A1 * | 8/2008 | Tsujihama et al. .......... 198/411 |
| 2008/0231642 | A1 * | 9/2008 | Okita .......................... 345/629 |
| 2009/0288007 | A1 * | 11/2009 | Leacock et al. ............. 715/716 |
| 2010/0053325 | A1 * | 3/2010 | Inagaki ....................... 348/143 |
| 2010/0142542 | A1 * | 6/2010 | Van Wie et al. ............. 370/400 |

FOREIGN PATENT DOCUMENTS

| JP | 2001-32219 | 2/2001 |
| JP | 2001-265812 | 9/2001 |

(Continued)

*Primary Examiner*—Ruay L Ho
(74) *Attorney, Agent, or Firm*—Fitzpatrick, Cella, Harper & Scinto

(57) ABSTRACT

An image display method and apparatus for displaying a plurality of items of moving image data on a screen include determining a virtual radius of a circular display area displaying one item of moving image data, and determining display positions of the plurality of items of moving image data on the screen such that another item of moving image data is not displayed within a circular display area having the determined radius centered at a display position of one item of moving image data. Each of the plurality of items of moving image data is displayed at the determined display positions.

9 Claims, 19 Drawing Sheets

FOREIGN PATENT DOCUMENTS

| | | |
|---|---|---|
| JP | 2001-326881 | 11/2001 |
| JP | 2003-058101 A | 2/2003 |
| JP | 2003-131654 A | 5/2003 |
| JP | 2004-032535 A | 1/2004 |
| JP | 2004-173306 A | 6/2004 |

* cited by examiner

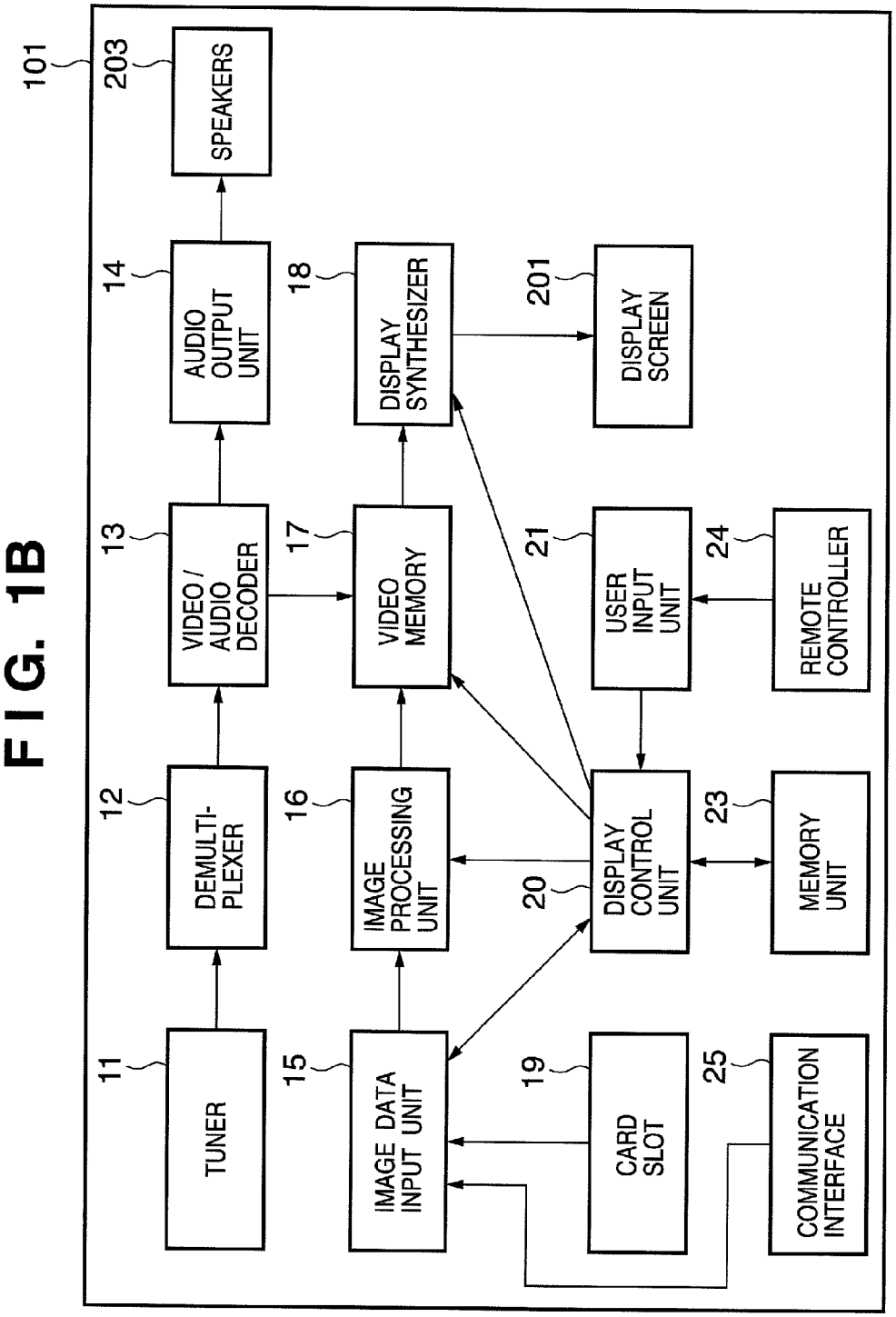

FIG. 3C

| POSITION NO. | DISPLAY POSITION | PLACED IMAGE DATA |
|---|---|---|
| (1) | (xxx, yyy) | |
| (2) | (ppp, ggg) | |
| (3) | (mmm, nnn) | |
| ⋮ | ⋮ | ⋮ |

FIG. 7

| AREA NO. | COORDINATES | NUMBER OF ITEMS OF MOVING IMAGE DATA | POSITION NUMBERS USED |
|---|---|---|---|
| 1 | (aaa, bbb)(ccc, ddd) | 0 | |
| 2 | | 0 | |
| ⋮ | ⋮ | ⋮ | |

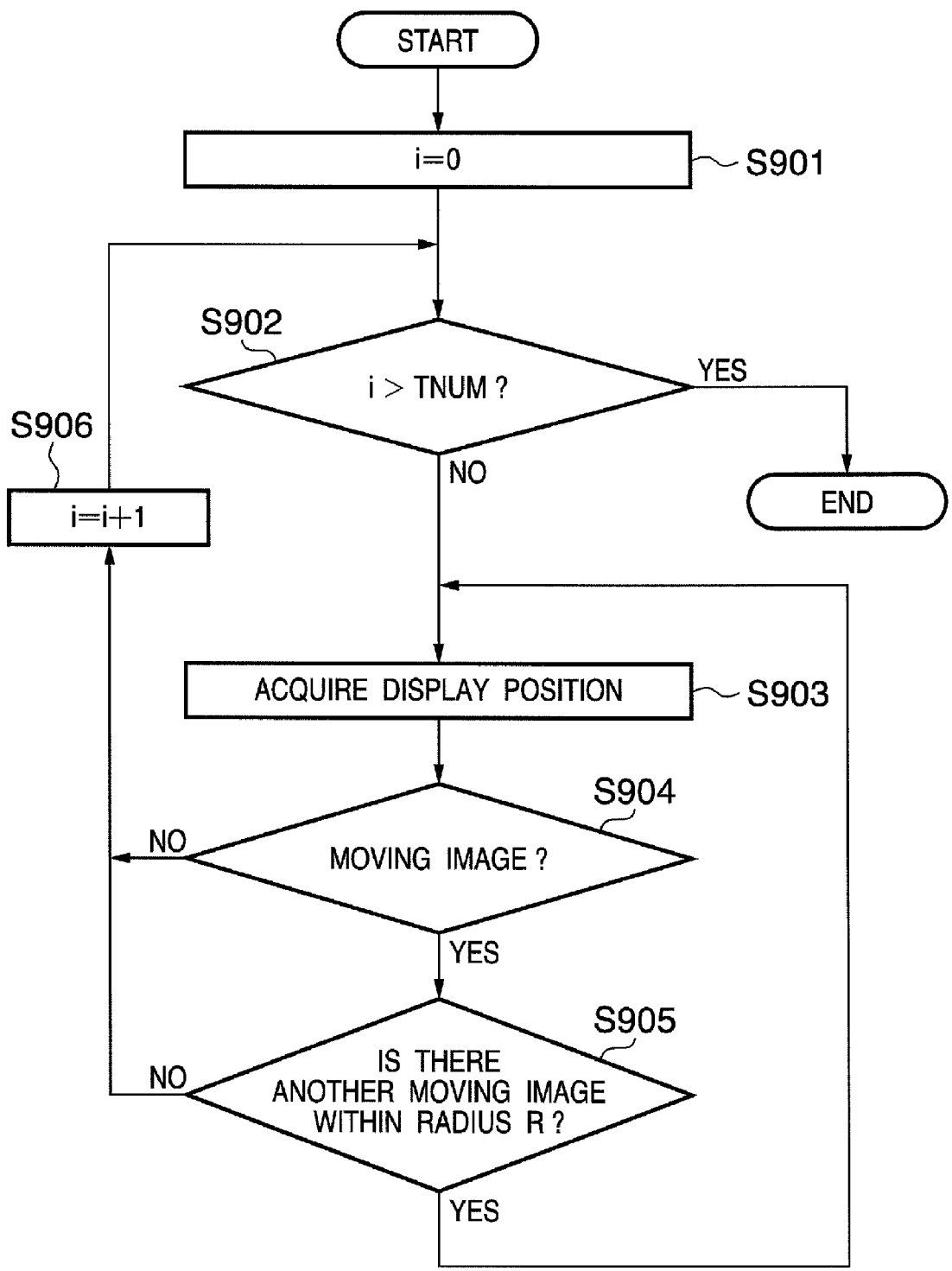
F I G. 11

IMAGE DISPLAY APPARATUS AND METHOD

BACKGROUND OF THE INVENTION

1. Field of the Invention

The present invention relates to an image display technique capable of reproducing and displaying a plurality of moving images on the same screen simultaneously.

2. Description of the Related Art

Prices continue to fall for a moving-image shooting apparatuses such as digital video camcorders using magnetic tape as the recording medium, and such apparatuses have come into widespread use in the home. Inexpensive moving-image shooting apparatuses that use a hard-disk drive, optical disk or large-capacity semiconductor memory instead of magnetic tape as the recording medium have also appeared on the market, and digital still cameras and mobile telephones are also generally equipped with a moving image shooting function. Thus, today's technology enables people to shoot moving image data with ease.

In particular, with regard to a moving image shooting apparatus having a recording medium of a hard-disk drive, optical disk or semiconductor memory type, there are a wide variety of styles in which these recording media and main body of the apparatus are connected to a personal computer or the like and moving image data recorded on the medium is enjoyed. With regard to such enjoyment of moving image data using a personal computer, use is often made of applications for displaying a plurality of items of moving image data in the form of an array on a display screen.

Further, systems in which a moving image shooting apparatus of the above-described kind is connectable to a TV receiver or TV-program recording apparatus have appeared on the market. In these apparatuses, use is made of a technique in which a plurality of items of moving image data are displayed in the form of an array on a display screen. In particular, the image display portion of TV receivers is in the process of becoming thinner, larger in area and lower in cost, and TV receivers having large-size screens (referred to as "large-screen TVs" below) of even greater size are expected to come into widespread use in the future. Thus it is predicted that display configurations in which a plurality of moving images are reproduced simultaneously on a single display screen will become more commonplace in the future.

Consider a situation where a plurality of items of moving image data are displayed in the form of an array on a display screen. One conceivable method is to array and display first-frame images (still images) of moving image data. In this case, the content of the frame image being displayed does not necessarily symbolize the content of the moving image data. Accordingly, in a case where a user wishes to retrieve desired moving image data from the display where images are arrayed (hereinafter referred to as a list display), the inevitable result is a decline in retrievability.

On the other hand, a method of reproducing and displaying all moving images displayed in an array form also is conceivable. However, if a plurality of moving images are arrayed on one screen and the moving image data is reproduced simultaneously, viewability of the moving images by the user declines and it becomes difficult for the user to distinguish each item of moving image data.

In order to overcome these difficulties, the specification of Japanese Patent Application Laid-Open No. 2001-326881 displays a plurality of icons and reproduces only the moving image of an icon selected by the user employing a cursor or the like, thereby facilitating ease of viewing by the user and identifiability of each item of moving image data.

Further, the specification of Japanese Patent Application Laid-Open No. 2001-265812 lays out and display icons of moving image data in virtual three-dimensional space. The arrangement is such that the user designates coordinates in this three-dimensional space and reproduces all of the moving image data situated at the spatial coordinates near the input coordinates designated. Further, the specification of Japanese Patent Application Laid-Open No. 2005-32219 describes an arrangement in which some images are overlapped to present a list display in order that the list display may be presented more efficiently.

However, in the case of Japanese Patent Application Laid-Open No. 2001-326881, only moving image data designated by the user can be reproduced and operation by the user is required in order to confirm the content of moving image data not reproduced.

Further, Japanese Patent Application Laid-Open No. 2001-265812 is such that all moving image data placed in the vicinity of the position designated by the user is reproduced. Although all moving image data is not reproduced, a plurality of items of moving image data near the position designated by the user are reproduced simultaneously. Consequently, depending upon the structure of the display apparatus, there is a marked decline in viewing ease of the moving images by the user and in the identifiability of each item of moving image data. Furthermore, although Japanese Patent Application Laid-Open No. 2005-32219 controls the position of still image data based upon the relationship between the focusing position of the still image data and position at which display images overlap, it does not take into consideration the position at which moving image data is reproduced.

In order to solve these problems, there is demand for a method of laying out a plurality of items of moving image data and a method of reproducing image data that take into consideration the size of the display screen.

SUMMARY OF THE INVENTION

Accordingly, an object of the present invention is to make it possible to suitably decide a playback display position of moving image data and improve viewability by the user in a case where a plurality of items of moving image data are displayed in the form of an array.

According to one aspect of the present invention, there is provided an image display method of displaying a plurality of items of moving image data on a screen, comprising the steps of:

determining whether a divided area on the screen, to which one moving image data belongs, has another moving image data placed therein; and controlling to start reproducing the plurality of items of moving image data one after another in the divided area, if another moving image data has been placed in the divided area.

Furthermore, according to another aspect of the present invention, there is provided an image display apparatus for displaying a plurality of items of moving image data on a screen, the apparatus comprising:

a determining unit adapted to determine whether a divided area on the screen, to which one moving image data belongs, has another moving image data placed therein; and a controlling unit adapted to control to start reproducing the plurality of items of moving image data one after another in the divided area, if another moving image data has been placed in the divided area.

Further features of the present invention will become apparent from the following description of exemplary embodiments with reference to attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1B is a block diagram illustrating an implementation for controlling the large-screen TV shown in FIG. 1A;

FIG. 3C is a diagram illustrating an example of the composition of data in a display position table;

FIG. 7 is a diagram illustrating an example of the composition of data in a divided-area table;

FIG. 11 is a flowchart illustrating processing for deciding display position of an image according to the second embodiment;

DESCRIPTION OF THE EMBODIMENTS

Preferred embodiments of the present invention will now be described in detail in accordance with the accompanying drawings.

First Embodiment

Figure 1A:
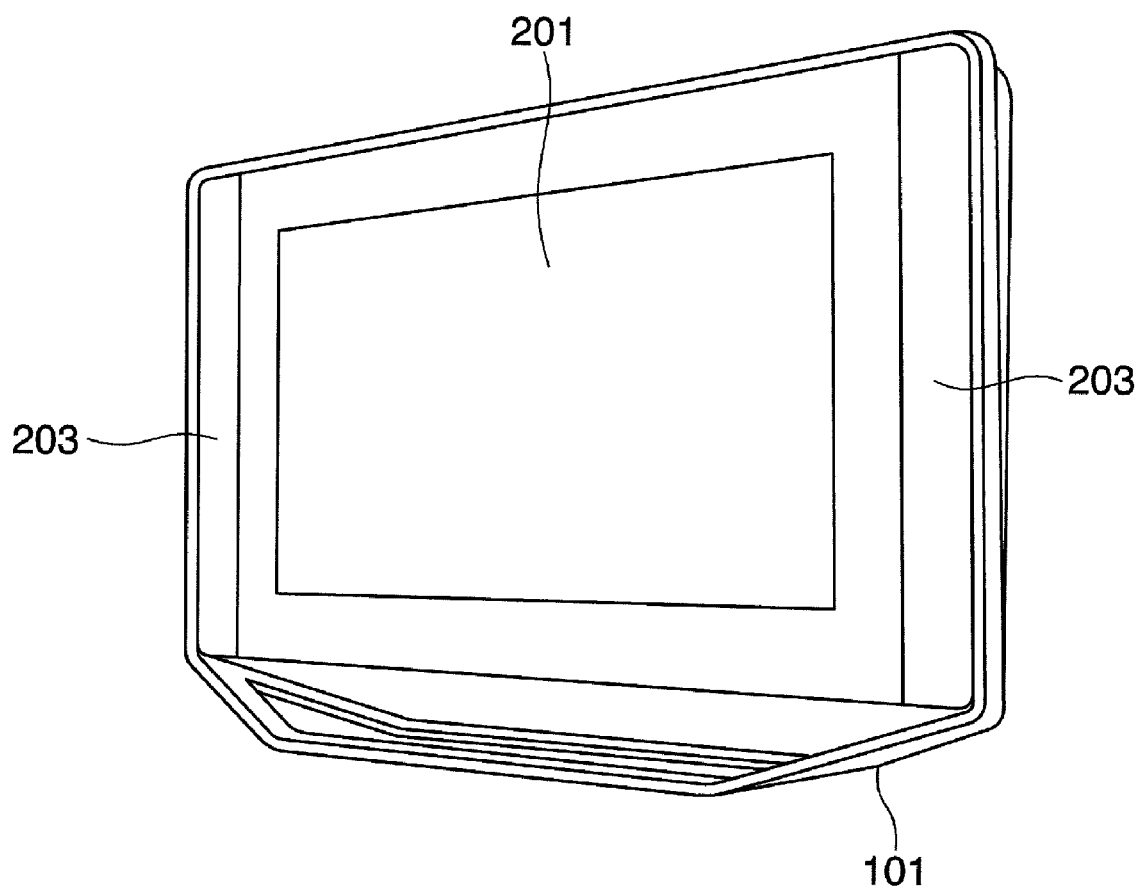
FIG. 1A is an external view of a large-screen TV according to a first embodiment of the present invention.

FIG. 1A is an external view of a large-screen TV 101 according to a first embodiment of the present invention. As shown in FIG. 1A, the large-screen TV 101 has a display screen 201 and speakers 203. Images that have been processed according to the image processing method of this invention are displayed on the display screen 201. Although a flat-screen TV of the kind depicted in FIG. 1A is used as a display apparatus for displaying a plurality of moving images in this embodiments the invention is not limited to a flat-screen TV. For example, the apparatus may be a projection TV or a monitor apparatus not equipped with a tuner or the like. Further, the screen size is not limited to that exemplified in the embodiments below.

FIG. 1B is a block diagram illustrating an implementation for controlling the large-screen TV 101. In FIG. 1B, a signal received by an antenna (not shown) is input to a tuner 11. The latter subjects the input signal to processing such as demodulation and error correction and generates digital data in a format referred to as a "transport stream" (the data is referred to as "TS data" below). The tuner 11 subjects the generated TS data to descramble processing and outputs the resultant signal to a demultiplexer 12.

The demultiplexer 12 extracts video data and audio data from the TS data in which have been time-division multiplexed a plurality of channels of video and audio data that have entered from the tuner 11, electronic program guide (EPG) data and data broadcast data, etc. The extracted video data and audio data is output to a video/audio decoder 13. Video data that has been processed by the video/audio decoder 13 is written to a video memory 17 and is output to the display screen 201 via a display synthesizer 18. The audio data, on the other hand, is output audibly from the speakers 203 by an audio output unit 14.

A card slot 19 is used to connect a removable memory card or the like and exchange data with a digital camera in this embodiment. An image data input unit 15 reads in digital image data from a memory card that has been inserted into the card slot 19. An image processing unit 16 applies image processing to the digital image data that has entered from the image data input unit 15 and writes the result to a video memory 17.

A display control unit 20 instructs the image data input unit 15 to read in an image, instructs the image processing unit 16 to execute processing, writes display data to the video memory 17, instructs the display synthesizer 18 to execute synthesis processing, and instructs a memory unit 23 to store information. Further, the display control unit 20 acquires command data from a remote controller 24 via a user input unit 21. The display control unit 20 further acquires shooting data, which has been appended to the digital image data, via the image data input unit 15. A communication interface 25 is a prescribed interface (e.g., a USB) for connecting to external equipment. Still image data and moving image data can be acquired from external equipment via the communication interface 25. Further, the display control unit 20 implements image-data list display processing described below with reference to FIGS. 5 and 6.

Figure 2:
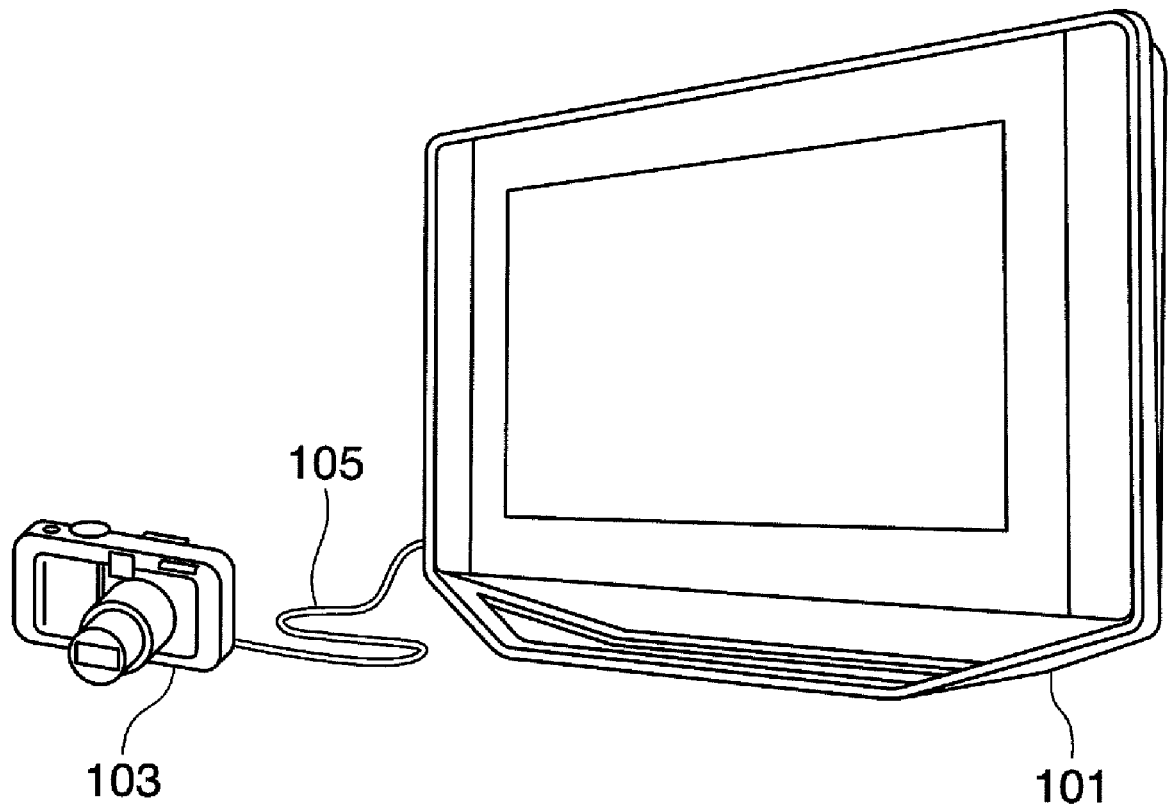
FIG. 2 illustrates the connection between the large-screen TV and a digital still camera.

FIG. 2 illustrates the connection between the large-screen TV 101 and a digital still camera 103. The digital still camera 103 is capable of shooting still image data and moving image data and of storing the thus obtained various data in a non-volatile memory within the digital still camera. As illustrated in FIG. 2, the large-screen TV 101 and digital still camera 103 are connected directly by a connecting cable 105. The latter is connected to the communication interface 25. When this connection is detected, the still image data and moving image data that has been stored in the digital still camera 103 starts being transferred automatically to the large-screen TV 101. That is, the still image data and moving image data are acquired at the large-screen TV 101 from the digital still camera 103, which is external equipment, by communication via the communication interface 25 and image data input unit 15.

It should be noted that the transfer of data from the digital still camera 103 to the large-screen TV 101 is implemented by an already standardized protocol. Further, it may be so arranged that a card such as a Compact Flash (registered trademark) or smart media removably inserted into the digital still camera 103 is inserted into the card slot 19 so that image data may be supplied to the large-screen TV 101.

Generally, in order to display a large quantity of image data in the form of an array, use is made of an index display in which thumbnail images of the image data are displayed in the form of a matrix. On the other hand, the aforementioned Japanese Patent Application Laid-Open No. 2005-32219 proposes displaying the images in a partially overlapping manner, thereby displaying the images in an array more efficiently than with the index display. It will be assumed below that the method of deciding display position of image data in this embodiment employs the method of Japanese Patent Application Laid-Open No. 2005-32219.

Figure 3A:
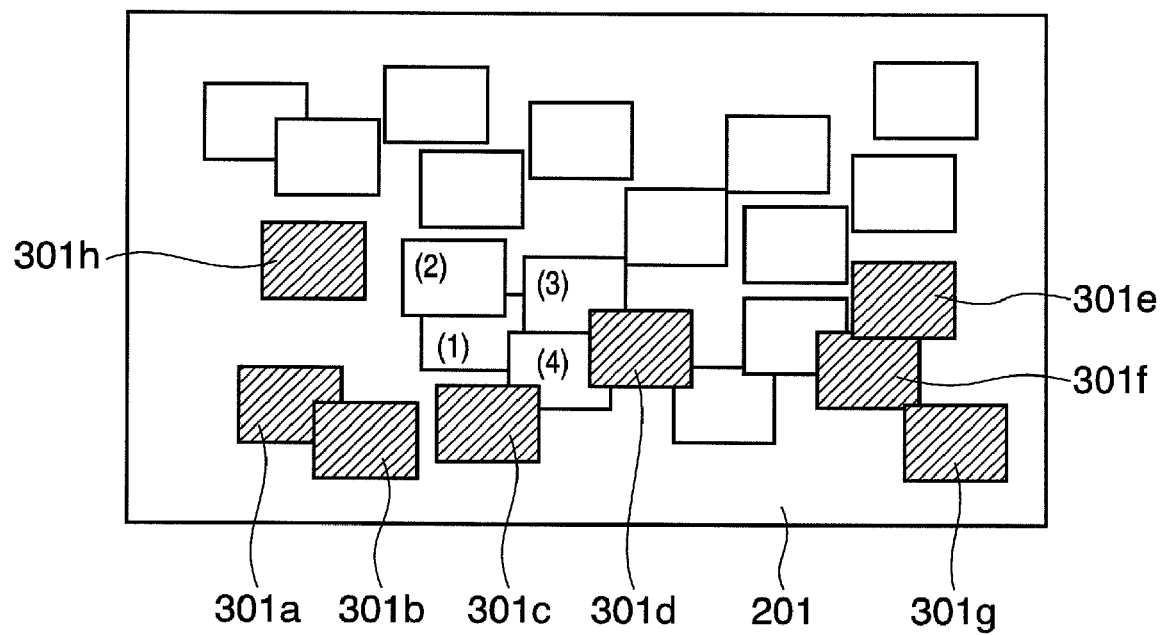
FIG. 3A is a diagram illustrating an example of a list display of mixed still image data and moving image data.

FIG. 3A is a diagram illustrating an example of a display in a case where a list display of mixed still image data and moving image data is presented without taking the display positions of moving image data into account. The remote controller 24 is provided with a switch for calling an image viewer function. If the image viewer function is called by operating this switch, the large-screen TV 101 presents a list display of images of the kind illustrated in FIG. 3A. In FIG. 3A, the rectangle within the display screen 201 of the large-screen TV 101 presents a display a various items of image data in the form of a list display. Hatched rectangles 301a to 301h indicate the placement of moving image data. The white rectangles indicate the placement of still image data. A plurality of items of image data that have been read in to the large-screen TV 101 from the digital still camera 103 or the like are displayed in the form of an array, as depicted in FIG. 3A, in response to a command from the user. In order to clarify the characterizing features of this application, first a case as illustrated in FIG. 3A where a list display is presented without taking into consideration the display positions of moving image data will be described, then a list display that does take into consideration the display positions of moving image data will be described.

Figure 3B:
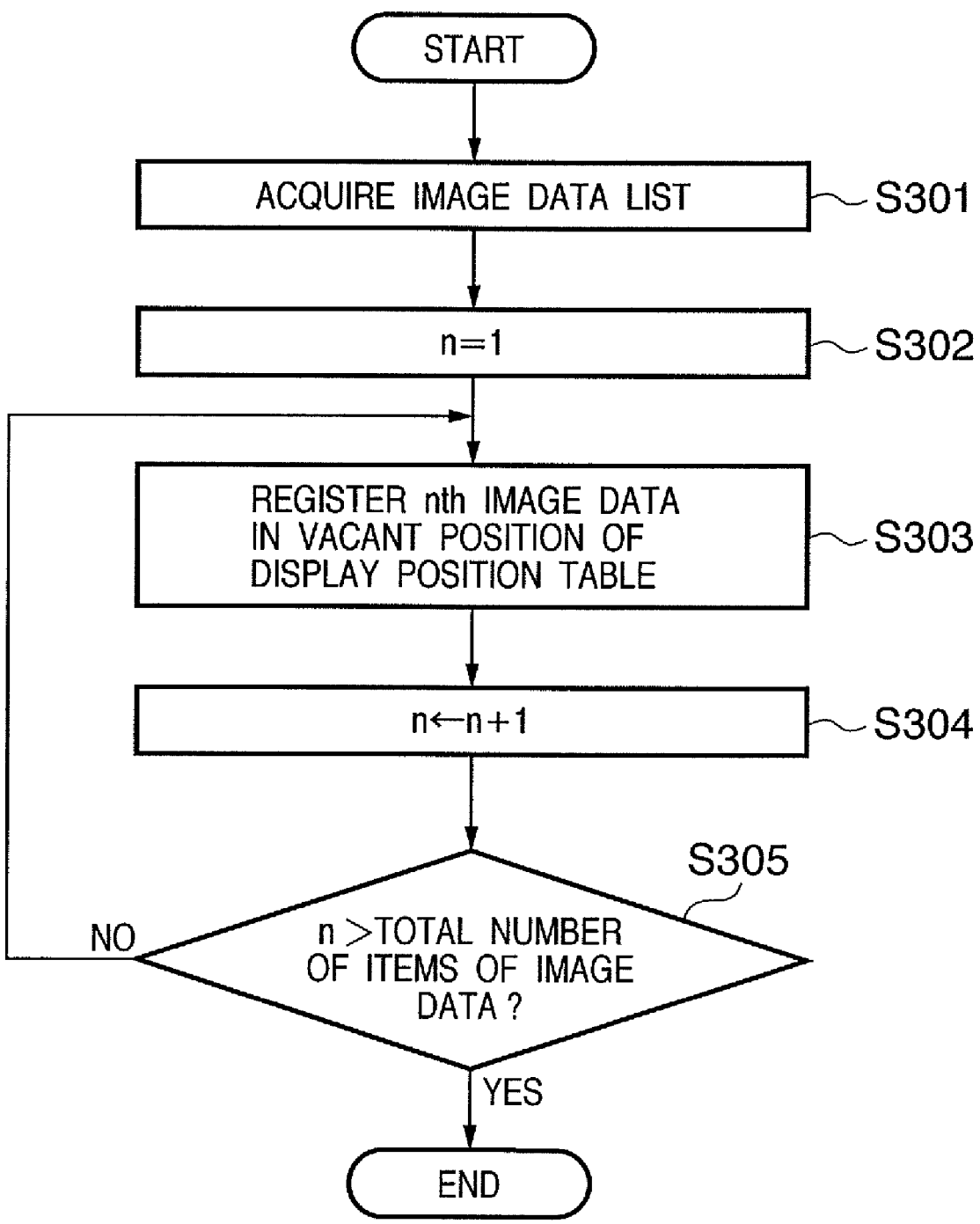
FIG. 3B is a flowchart useful in describing processing for presenting a list display of mixed still image data and moving image data.

FIG. 3B is a flowchart useful in describing display processing by the large-screen TV 101 in a case where a list display of images is presented without taking into consideration the display positions of moving image data. First, at step S301, the large-screen TV 101 acquires an image data list, which represents a group of items of image data to be display in the form of an array, in response to calling of the image viewer function. The image data list contains location information, size information and shooting information of data files of each of the items of image data in the image data group to be displayed in array form.

Next, at steps S302 to S305, a display position is decided with regard to each item of image data contained in the image data list. First, at step S302, 1 is set in a variable n for designating an image in the image data list. Next, at step S303, the nth image of image data is registered in a vacant position in a display position table. An example of the composition of data in the display position table is illustrated in FIG. 3C. The display position table is stored in the memory unit 23 and is for registering the display positions of image data of the kind shown in FIG. 3A. That is, the display position corresponding to a position number (1) is a rectangle of a prescribed size the upper right corner of which is (xxx,yyy). In step S303, image data is registered successively at the display positions that are vacant in the column entitled "PLACED IMAGE DATA".

Next, at step S304, n is incremented in order to process the next item of image data in the image data list. If n has not exceeded the total number of items of image data in the image data list, then control returns to step S303. If n has exceeded the total number of items of image data in the image data list, this means that placement of all images in the image data list has ended and, hence, processing is exited.

A list display of the kind shown in FIG. 3A can be implemented by the processing set forth above. However, the display positions of moving image data are not particularly taken into account by the above-described processing. Accordingly, there will be instances where the items of moving image data are displayed in overlapping form, close together or side by side, as indicated at 301a to 301c and 301e to 301g in FIG. 3A. If the items of moving image data are reproduced simultaneously in a case where the list display is presented with the items of moving image data clustered together, viewability by the user declines and it becomes difficult for the use to ascertain the content of each item of moving image data. Accordingly, in this embodiment, the placement of the image data is decided in such a manner that items of moving image data will not be laid out too close to one another. Image display processing according to this embodiment will now be described.

Figure 4:
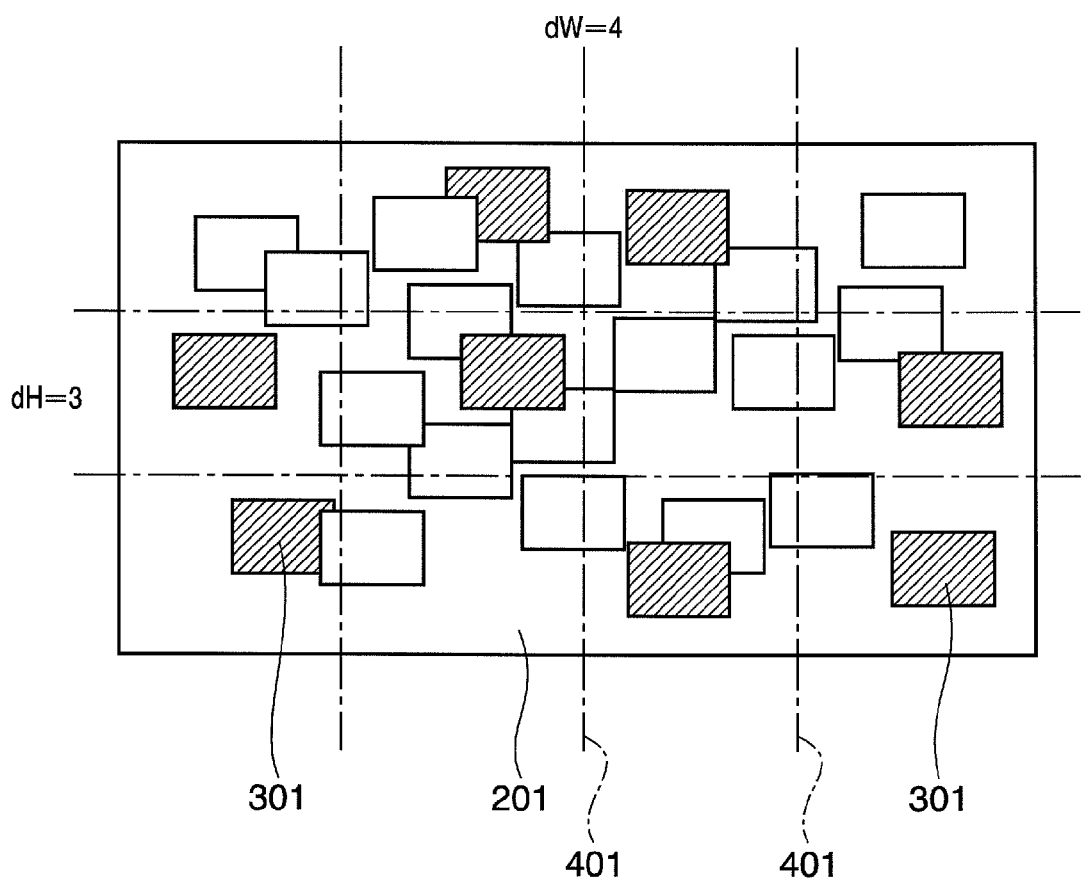
FIG. 4 is a diagram illustrating an example of a list display of mixed still image data and moving image data according to the first embodiment.

FIG. 4 is a diagram illustrating an example of a list display in which the display area in the list display of mixed still image data and moving image data is divided and moving image data is then placed in the display area. Partitioning lines 401 partition the display screen 201 virtually. In the actual list display, the partitioning lines 401 are not displayed on the display screen 201. In this embodiment, as illustrated in FIG. 4, rectangles 301 corresponding to items of moving image data are placed by being distributed, one by one, to the areas obtained by division by the partitioning lines 401 (these areas shall be referred to as "divided areas"), thereby preventing the items of moving image data from being laid out too close together. It should be noted that the sizes of the rectangles that display the still images an moving images are assumed to be fixed in the present embodiment.

Figure 5:
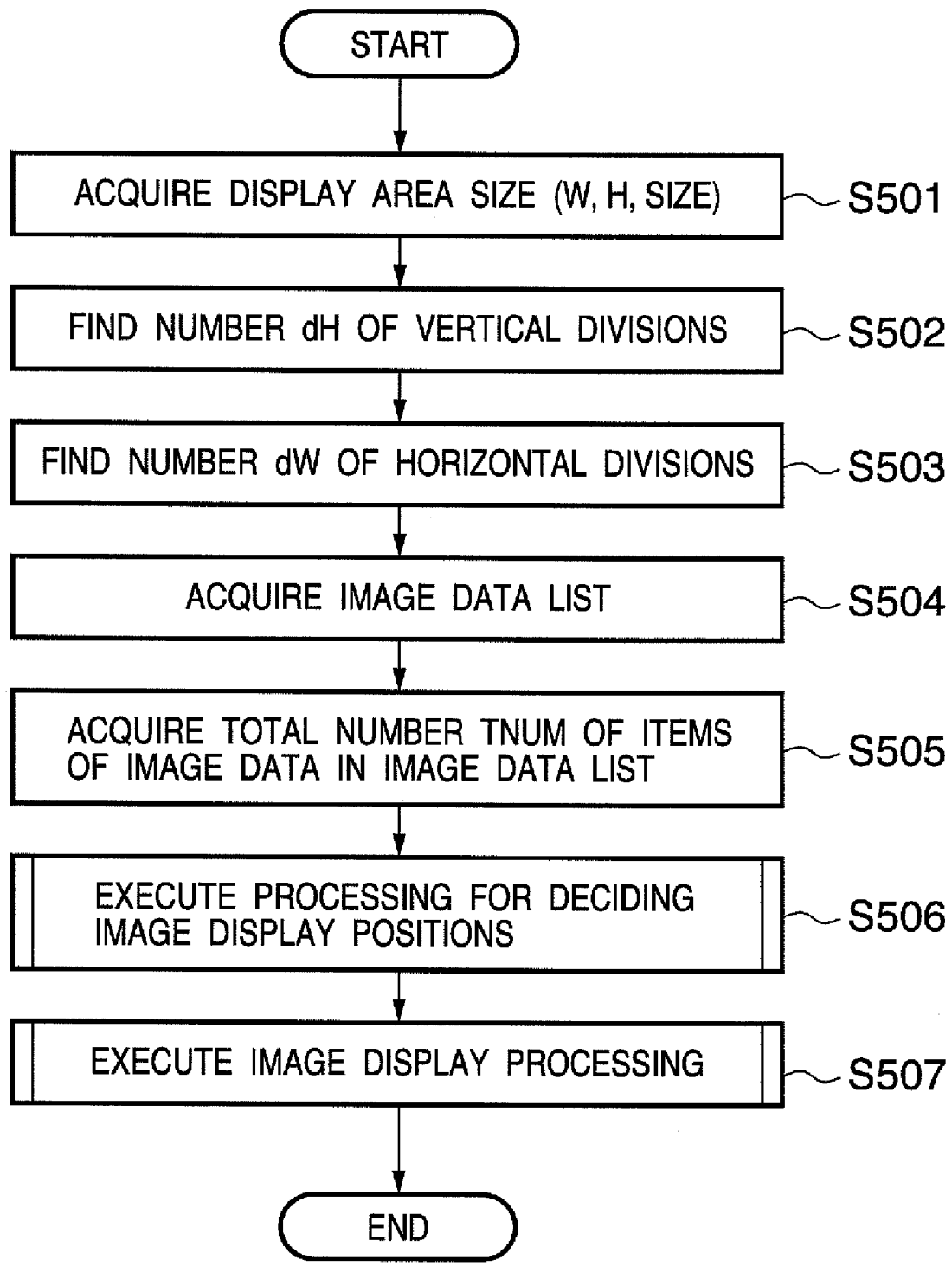
FIG. 5 is a flowchart illustrating list display processing according to the first embodiment.

FIG. 5 is a flowchart for describing list display processing according to this embodiment. This processing is started in a case where the user requests the large-screen TV 101 to execute list display processing of a certain group of image data. It is assumed that the processing shown in FIG. 5 is implemented by the display control unit 20.

First, at step S501, the display control unit 20 acquires the size of one list display area on the display screen 201, namely values of area height (number of pixels), area width (number of pixels) and display area size (length of the diagonal). Next, from the values of area height (number of pixels) and display area size (length of the diagonal) acquired at step S501, the display control unit 20 finds a number dH of divisions in the height direction of the display area based-upon a predetermined relationship between the display area size and vertical divisions at step S502. Then, from the values of area width (number of pixels) and display area size (length of the diagonal) acquired at step S501, the display control unit 20 finds a number dW of divisions in the width direction of the display area based upon a predetermined relationship between the display area size and vertical divisions at step S503.

It should be noted that in the case of a size 36-type screen (1280 pixels in the width direction and 720 pixels in the height direction), for example, the allocations are dH=3, dW=5. Further, in the case of a size 56-type screen (1920 pixels in the width direction and 1024 pixels in the height direction), the allocations are dH=5, dW=8. In FIG. 4, the state illustrated for reason of convenience in terms of the diagram is dH=3, dW=4, and 12 divided areas exist.

Next, at step S504, the display control unit 20 acquires a data list of the image data group (a group of image data to be presented in a list display) for which the user requested display processing. More specifically, data file location information, size information, shooting information and moving image/still image classification, etc., of each item of image data contained in the group of image data are acquired.

Next, at step S505, the display control unit 20 finds the total number TNUM of items of image data in the image data group contained in the image data list. Control proceeds to step S506, at which the display control unit 20 decides the display position of each item of image data from the total number TNUM of items of image data. The details of processing for deciding image display position at step S506 will be described later with reference to the flowchart of FIG. 6. Each image is placed and displayed on the display screen 201 at step S507 in accordance with the display position of each of the items of image data decided at step S506. This processing is executed after the image display is displayed on the display screen 201.

Figure 6:
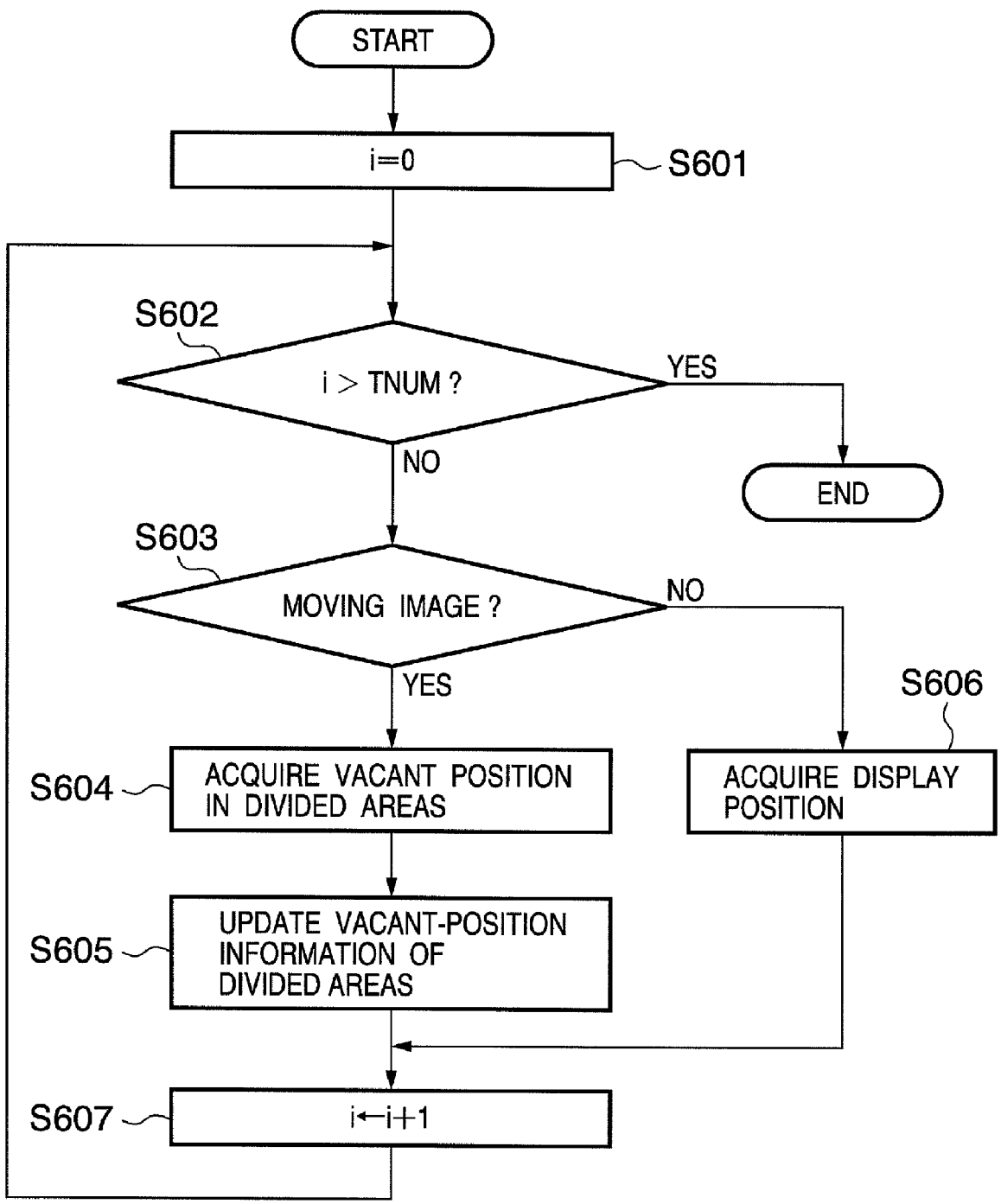
FIG. 6 is a flowchart illustrating processing for deciding display position of an image according to the first embodiment.

FIG. 6 is a flowchart illustrating processing for deciding display positions of moving image data when a list display is presented. This processing is called from step S506 and is started at execution of the list display processing illustrated in FIG. 5.

First, at step S601, a variable i is initialized to 0. The variable i points out target image data in the group of image data. Next, at step S602, the variable i pointing out the target image data and the total number TNUM of items of image data are compared. If the value of variable i is greater than TNUM, then it is judged that display positions of all items of image data in the image data group have been decided and this processing is exited. On the other hand, if the value of variable i is equal to or less than TNUM, then control proceeds to step S603 for the purpose of deciding the display position of the image data pointed out by the variable i.

It is determined at step S603 whether the image data pointed out by the variable i is moving image data. Control proceeds to step S604 if it is determined that this image data is moving image data and to step S606 if it is determined that the image data is not moving image data. The determination as to whether image data is moving image data is made based upon the extension of the image data file, by way of example.

At step S604, an area (vacant area) in which moving image data has not been placed is acquired from among the divided areas illustrated in FIG. 4 (divided areas obtained from the number dH of divisions in the height direction of the display area and number dW of divisions in the width direction of the display area). FIG. 7 is a diagram illustrating an example of the composition of data in a divided-area table according to this embodiment. Stored in the divided-area table with regard to each divided area are an area number specific to each divided area, coordinates (vertices of the diagonal in this embodiment), number of items of moving image data that have been assigned to this divided area, and position number of the position to which the moving image data has been allocated. The position number is a number that has been registered in the display position table of FIG. 3C. The divided area acquired by the processing of step S604 is that for which the number of items of moving image data is zero.

At step S605, one display position which resides in the divided area acquired at step S604 and for which image data has not been assigned is selected and decided upon as the display position of the moving image data. Although it is preferred that the entire rectangle fit within the divided area as the selected display position, in this embodiment it is determined, for the sake of speeding up processing, whether the coordinates of the center of the image fall within the divided area. That is, a display position for which image data has not been assigned and which falls within the divided area acquired at step S604 is decided upon as the display position of the moving image data. The number of items of moving image data of the divided area acquired at step S604 is then updated and the position number of the selected display position is registered as the position number used, thereby updating the information concerning the divided area. It should be noted that this image data is registered at this time in the "PLACED IMAGE DATA" column of the applicable display position in the display position table illustrated in FIG. 3C.

If it is determined at step S603 that the image data indicated by the variable i is not indicative of a moving image, the control proceeds to step S606. Since the image data pointed out by the variable i is not moving image data, then, at step S606, use is made of the display position data of FIG. 3C and the image data (still image data) is assigned to the display position where image data has not yet been placed. After the display position of the image data pointed out by the variable i is decided, control proceeds to step S607.

The value of the variable i that is for the purpose of pointing out the next item of image data is incremented at step S607 and the result is stored in the variable i. Control then proceeds to step S602, at which the above-described processing is repeated with regard to the next item of image data.

Figure 8:
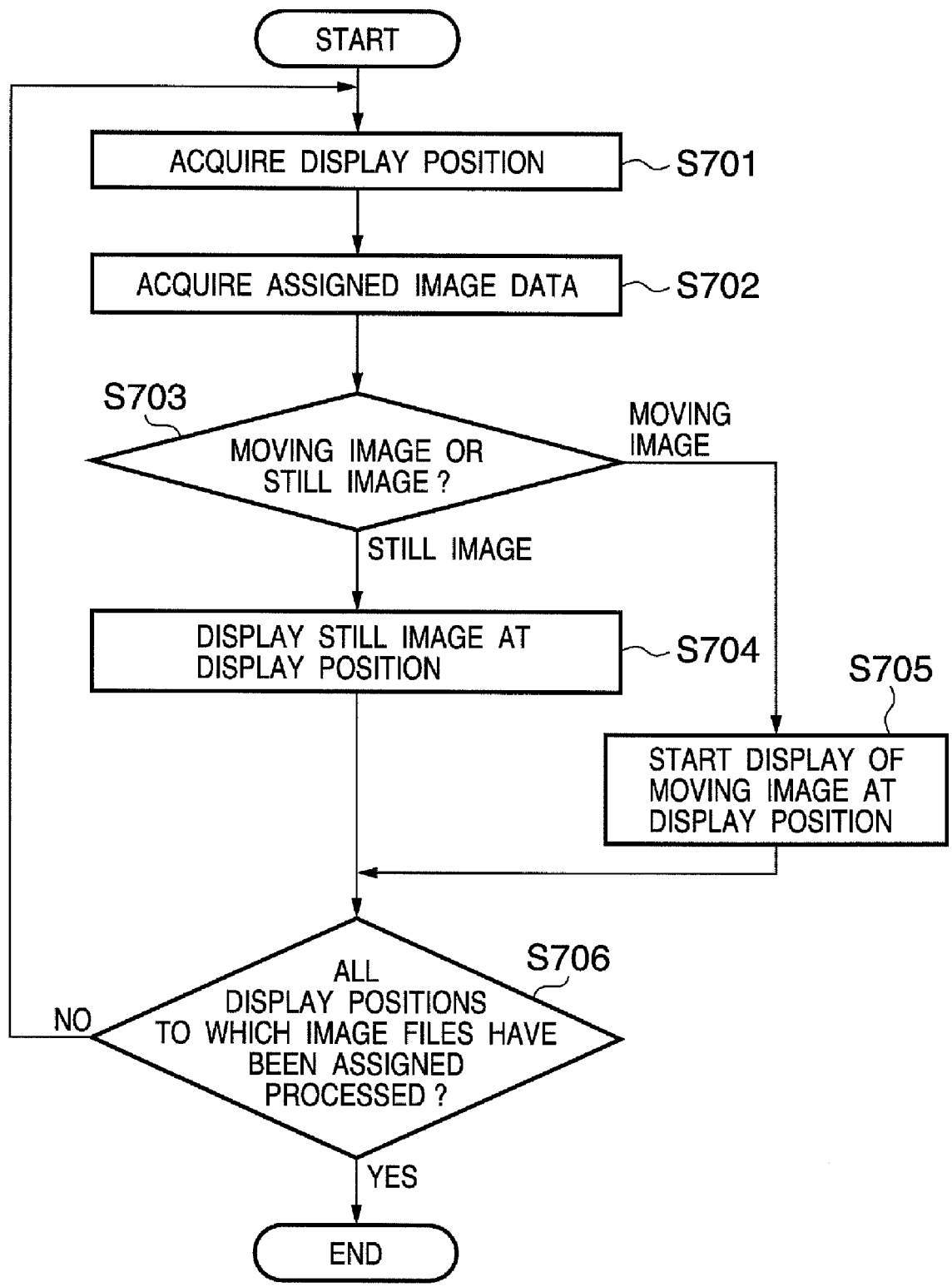
FIG. 8 is a flowchart useful in describing image display processing according to the first embodiment.

FIG. 8 is a flowchart useful in describing the display processing of step S507 in FIG. 5. At step S701 in FIG. 8, the display control unit 20 acquires one display position, to which image data has been assigned, from the display position table (FIG. 3C) for which assignment of image data has been completed. This is followed by step S702, at which the image data that has been assigned to the display position acquired at step S701 is acquired. If the image data acquired is still image data, then control proceeds from step S703 to step S704, at which this still image data is displayed at the display position. If the image data acquired is moving image data, then control proceeds from step S703 to step S705, at which display of this moving image data at the display position is started. It is determined at step S706 whether the above-described display processing (steps S701 to S705) has ended with regard to all display positions to which image data has been assigned in the display position table. If the display position is one to which image data has been assigned and has not yet been processed, control returns to step S701 and the above-described display processing is repeated. If the display processing has ended with regard to all display positions to which image data has been assigned, the processing of FIG. 8 is exited. A display of the kind shown in FIG. 4 is implemented by the processing described above.

In accordance with the first embodiment, as described above, the display positions of moving image data are decided in such a manner that a plurality of items of moving image data will not exist within a prescribed zone (within a divided area) on a display screen. As a result, it is possible to prevent a display in which some of a plurality of items of image data overlap or are placed too close together. This improves viewability of moving images by the user.

Second Embodiment

The first embodiment is such that in order to prevent moving image data from being displayed in overlapping form or too close together, the display area is divided and layout is decided so as to display one item of moving image data in each divided area. However, the method of deciding layout of moving image data is not limited to such an arrangement. In a second embodiment, display position is decided in such a manner that when moving image data is laid out, other moving image data will not exist in a prescribed zone in which moving image data has already been placed.

Figure 9:
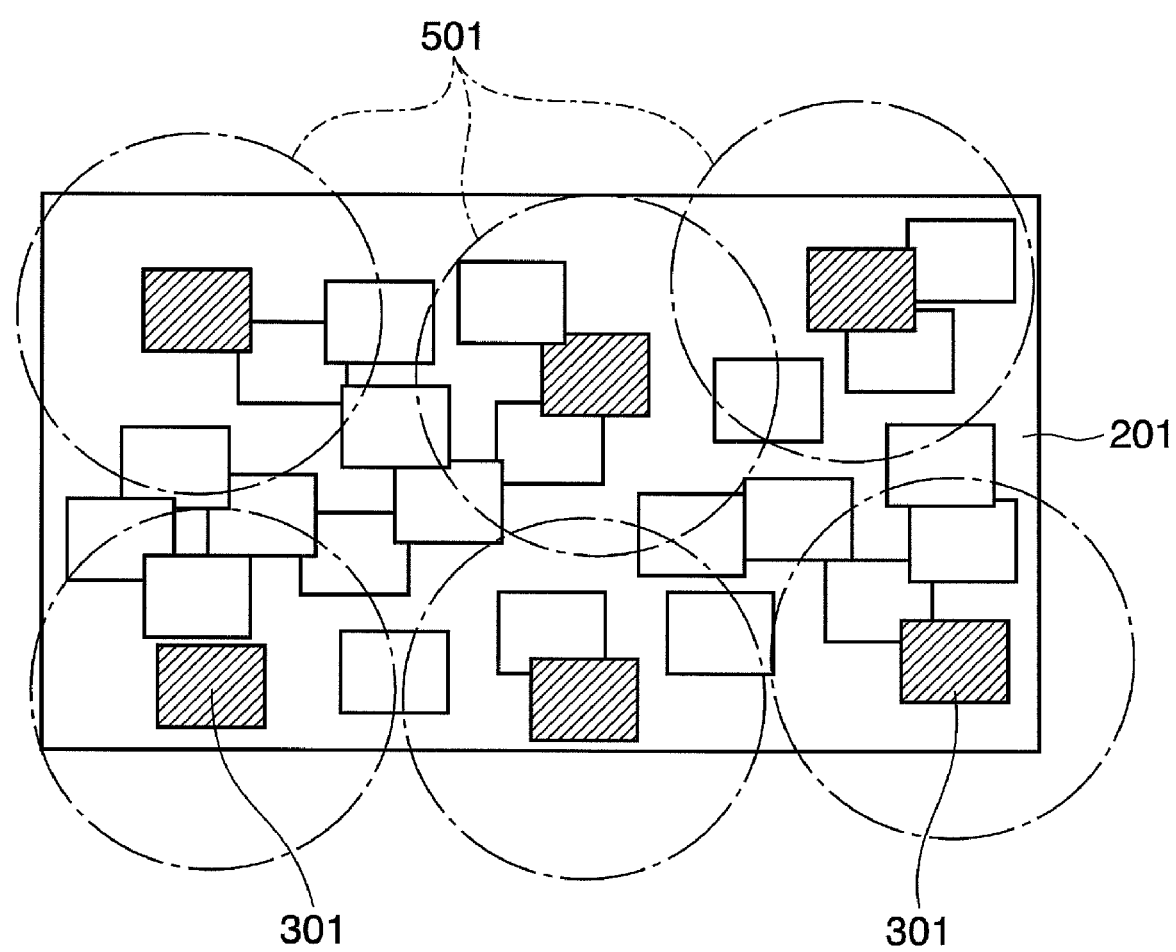
FIG. 9 is a diagram illustrating an example of a list display of mixed still image data and moving image data according to a second embodiment of the present invention.

FIG. 9 is a diagram useful in describing a list display of mixed still image data and moving image data in the second embodiment. Here the hatched rectangles 301 indicate the display positions of moving image data. In FIG. 9, circular areas 501 of a prescribed diameter centered on the rectangles 301 that display moving image data have been set. The circular areas 501 are virtual and are not actually displayed on the display screen 201. In the second embodiment, as depicted in FIG. 9, moving image data is laid out by being dispersed in such a manner that a rectangle 301 for other moving image data will not reside in each circular area 501.

Figure 10:
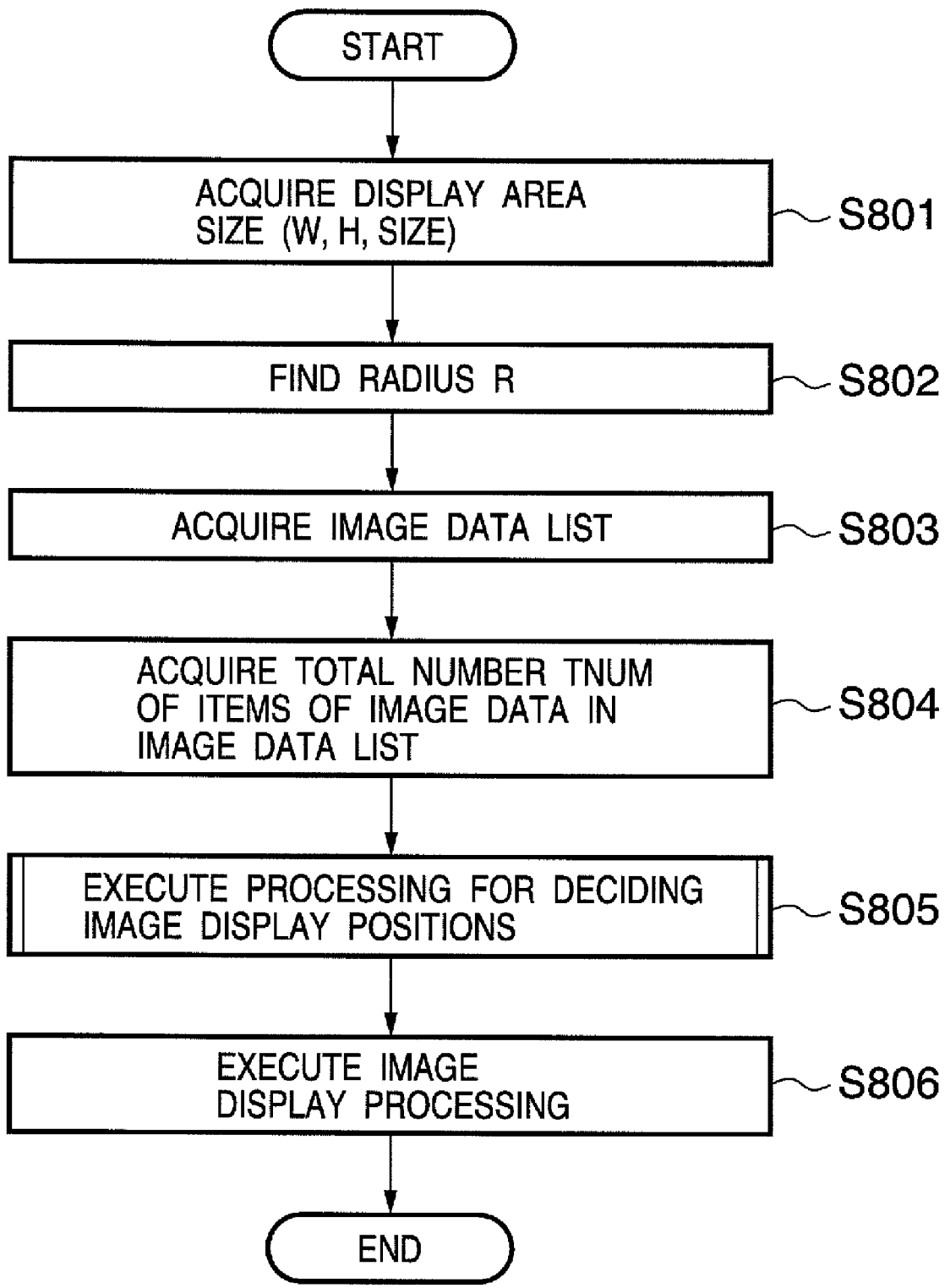
FIG. 10 is a flowchart illustrating list display processing according to the second embodiment.

FIG. 10 is a flowchart illustrating list display processing. This processing is started in a case where the user requests the large-screen TV 101 to execute list display processing of a certain group of image data. The processing also is executed by the display control unit 20.

At step S801, the display control unit 20 acquires the size of one list display area on the display screen 201, namely values of area height (number of pixels), area width (number of pixels) and display area size (length of the diagonal). Next, at step S802, from the size of the list display area acquired at step S801, the display control unit 20 decides the radius R of the circular area 501 for dispersing of moving image data presumed to be optimum for viewing by the user. For example, the value of radius R optimum for the size of each display area is loaded into the apparatus as a table (e.g., stored in the memory unit 23) in advance and the radius R is decided from the display area size, acquired at step S801, and the table.

It should be noted that in the case where the values of the radius R is that of a size 36-type screen (1280 pixels in the width direction and 720 pixels in the height direction), for example, the allocation is R=100 pixels in this embodiment. Further, in a case of a size 56-type screen (1920 pixels in the width direction and 1024 pixels in the height direction), the allocation is R=160 pixels. This is a value found based upon a quantitative evaluation of user viewability in terms of the display area size (length of the diagonal).

Next, at step S803, the display control unit 20 acquires a data list of the image data group for which the user requested display processing. More specifically, data file location information, size information and shooting information, etc., of each item of image data contained in the group of image data are acquired. The display control unit 20 finds the total number TNUM of items of image data in the image data group at step S804.

The display control unit 20 decides the display position of each item of image data from the total number TNUM of items of image data at step S805. The details of processing for deciding image data display position will be described later with reference to the flowchart of FIG. 11. Processing is executed at step S806 to place and display each image on the display screen 201 in accordance with the display position of each of the items of image data decided at step S805. The processing of step S806 is as described above with reference to FIG. 8. This processing is executed after the display of image data on the display screen 201 is completed.

FIG. 11 is a flowchart according to the second embodiment illustrating processing for obtaining display positions of moving image data when a list display is presented. This processing is executed by the display control unit 20 at step S805 at execution of the list display.

First, at step S901, a variable i is initialized to 0. The variable i points out target image data in the group of image data. Next, at step S902, the variable i pointing out the target image data and the total number TNUM of items of image data are compared. The variable i points out a number specific to the target image data in the image data group. If the value of variable i is greater than TNUM, then it is judged that display positions of all items of image data have been decided and this processing is exited. On the other hand, if the value of variable i is equal to or less than TNUM, then control proceeds to step S903 in order to decide the display position of the image data pointed out by the variable i.

At step S903 the display control unit 20 acquires the display position of the image data pointed out by the variable i. That is, the display control unit 20 uses the display position table of FIG. 3C to acquire a display position, to which image data has not yet been assigned, as the display position of the image data pointed out by the variable i. If the image data pointed out by the variable i is still image data ("NO" at step S904), then the display control unit 20 decides that the acquired display position is the display position of the image data and control proceeds to step S906. Here the value of the variable i is incremented in order to decide the display position of the next item of image data and control returns to step S902.

If it is determined at step S904 that the image data indicated by the variable i is indicative of a moving image, the control proceeds to step S905. Here the coordinates of the center of a display rectangle are found from the display position acquired at step S903 and whether other moving image data has been placed within a circle of radius R having these center coordinates is investigated. The center coordinates are used in order to speed up processing. If other moving image data has been placed within the circle of radius R, control returns to step S902 and the processing for deciding the display position of the image data is repeated based upon new display image data. If it is determined at step S905 that other image data has not been placed within the circle of radius R, then this display position is decided upon as the display position of this moving image data and control proceeds to step S906.

In accordance with the second embodiment, as described above, the display positions of moving image data are decided in such a manner that a plurality of items of moving image data will not exist within a prescribed zone (within a circular area of radius R) on a display screen. As a result, it is possible to prevent a display in which some of a plurality of items of image data overlap or are placed too close together. This improves viewability of moving images by the user.

Third Embodiment

In the first embodiment, display position is decided so as to assign one item of moving image data to one divided area. However, in the event that the number of items of moving image data is greater than the number of divided areas, a plurality of items of moving image data will come to be laid out in one divided area.

Figure 12:
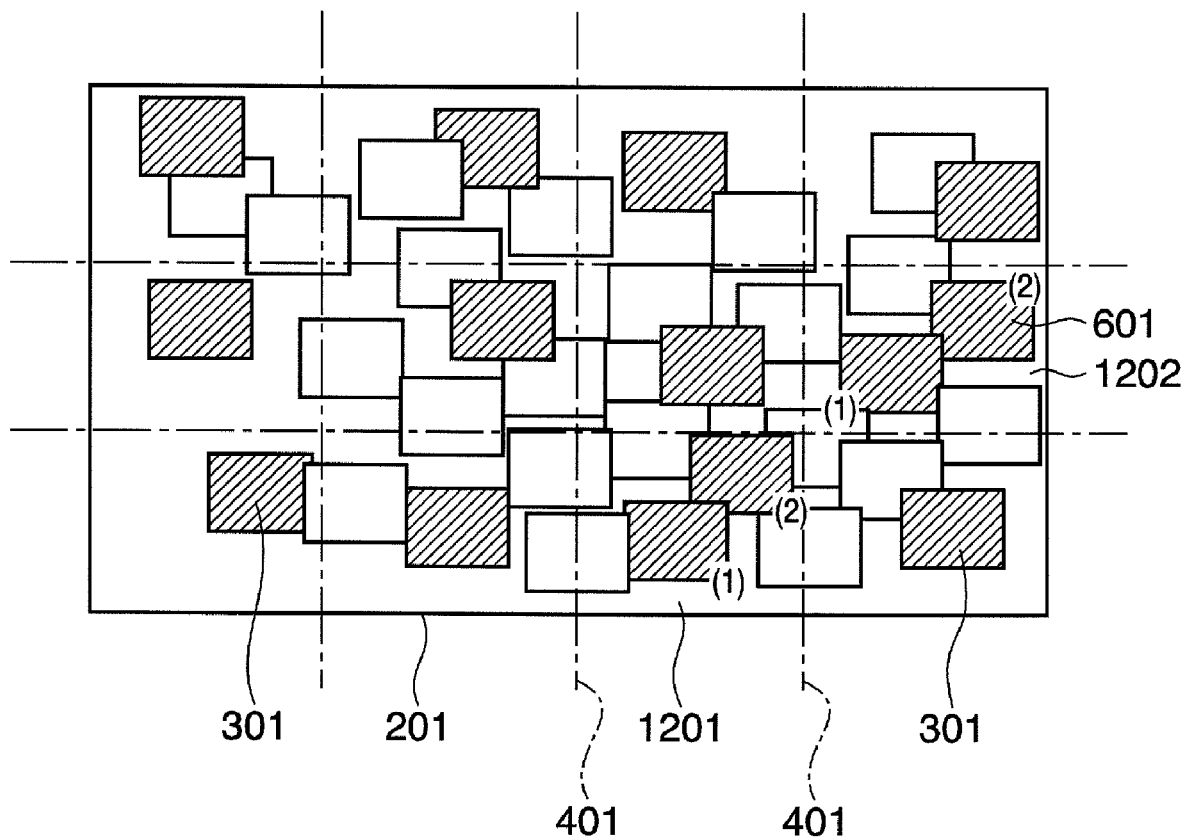
FIG. 12 is a diagram illustrating an example of a list display of mixed still image data and moving image data according to a third embodiment of the present invention.

FIG. 12 illustrates the state of such a display. Two items of moving image data have been placed in each of divided areas 1201 and 1202. This decision regarding display position is rendered for example by handling an area for which the number of items of moving image data is one as a vacant area in a case where a divided area for which the number of items of moving image data is zero no longer exists in the divided-area table of FIG. 7 at steps S604, S605.

If a plurality of items of moving image data have been placed in one divided area and these moving images are reproduced simultaneously, then a plurality of moving images will be reproduced at positions close together, thereby lowering ease of viewability. In order to avoid this phenomenon, the third embodiment is so adapted that the reproduction of moving images is changed over successively in regard to an area in which a plurality of items of moving image data have been placed. Thus, a plurality of moving images will not be reproduced simultaneously in one divided area and a decline in viewability is prevented.

Figure 13:
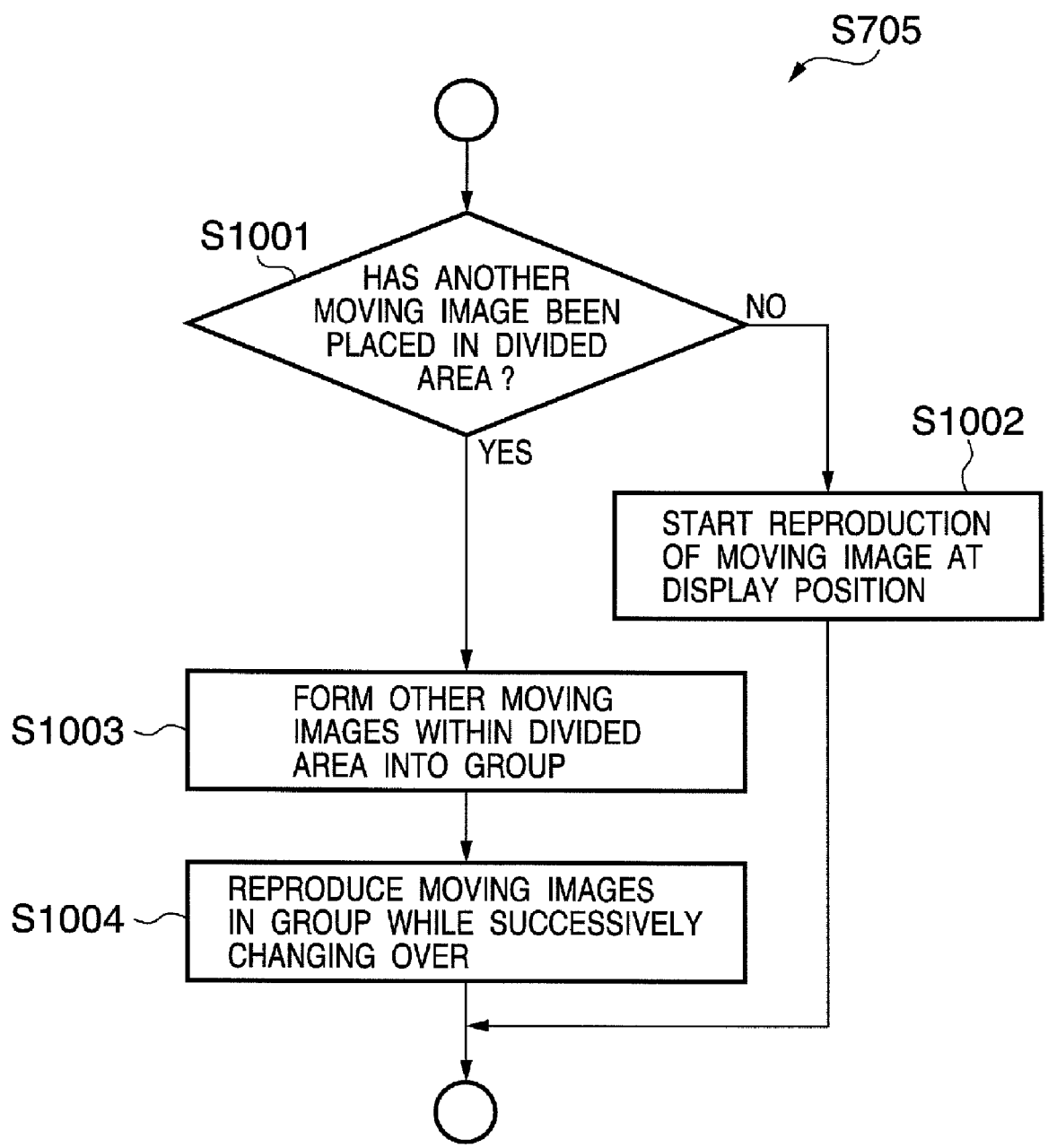
FIG. 13 is a flowchart useful in describing processing for displaying moving image data in the third embodiment.

FIG. 13 is a flowchart useful in describing processing for displaying moving images according to the third embodiment. The processing illustrated in FIG. 13 corresponds to step S705 in FIG. 8. The steps set forth below are executed by the display control unit 20.

If it is determined at step S703 that the image data represents a moving image, then, at step S1001 in FIG. 13, it is determined whether a divided area to which the display area of this moving image belongs has another moving image placed therein. If another moving image has not been placed in this divided area, control proceeds to step S1002 and playback of the moving image is started.

If another moving image has been placed in this divided area, on the other hand, then control proceeds from step S1001 to step S1003. Here all moving images that have been laid out in this divided area are formed into a group. Then, at step S1004, reproduction of the moving images in the group is started while the moving images are changed over successively. Thus, in the event that a plurality of moving images have been placed in one divided area, the moving images are reproduced while successively changing over the plurality of moving images within the group. Also, reproducing order of moving images is decided in accordance with recording date and time, file name, or number set in advance.

Various methods of changing over moving images to be reproduced are conceivable. Examples that can be mentioned are a method of changing over these moving images successively at prescribed times, and a method in which after the reproduction of one moving image ends, the changeover is made to reproduction of the next moving image. Further, it may be so arranged that the user specifies the timing for changing over moving images to be reproduced. Alternatively, it may be so arranged that only a moving image specified by the user is reproduced. It should be noted that the designation of a moving image can be implemented by constructing a user interface in which a cursor is moved by the remote controller 24, by way of example.

It should be noted that in a case where a plurality of rectangles 301 corresponding to items of moving image data have been placed in one divided area, as depicted in FIG. 12, playback order flags 601 may be appended to these items of moving image data and displayed. If this expedient is adopted, the moving image that will be displayed next can be ascertained with regard to a moving image that has not yet been reproduced. Further, a moving image currently not being reproduced in a list display is distinguished from still images.

Fourth Embodiment

In the first embodiment, the numbers of vertical and horizontal divisions are found from the size of the display screen and the divided areas are then decided. In a fourth embodiment, the numbers of vertical and horizontal divisions are decided upon taking into account the distance between the user and the large-screen TV.

Figure 14:
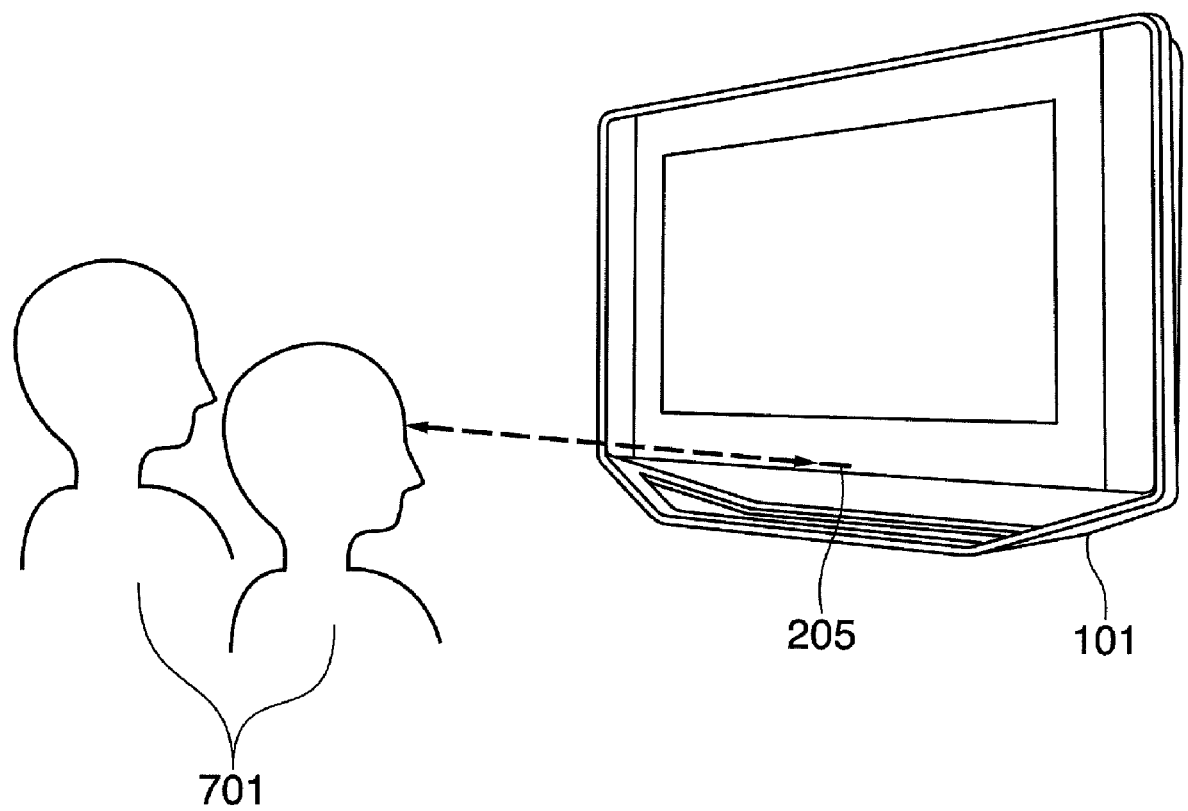
FIG. 14 illustrates a large-screen TV provided with a distance sensor for measuring distance to the user according to a fourth embodiment of the present invention.

FIG. 14 illustrates the large-screen TV 101 having a distance sensor 205 for measuring distance to the user. The distance sensor 205 measures the distance between the large-screen TV 101 and a user 701 viewing and listening to the large-screen TV 101. In the fourth embodiment, the distance sensor 205 estimates the distance between the user 701 and the display screen 201 of the large-screen TV 101 and changes the method of dividing the display area illustrated in FIG. 4. It should be noted that, by way of example, the distance sensor 205 generates ultrasonic waves from a vibration membrane employing a piezoelectric element that starts vibrating when a voltage is applied, and measures the distance between a target and the sensor based upon the time lag of ultrasonic waves that bounce back from the target.

Figure 15:
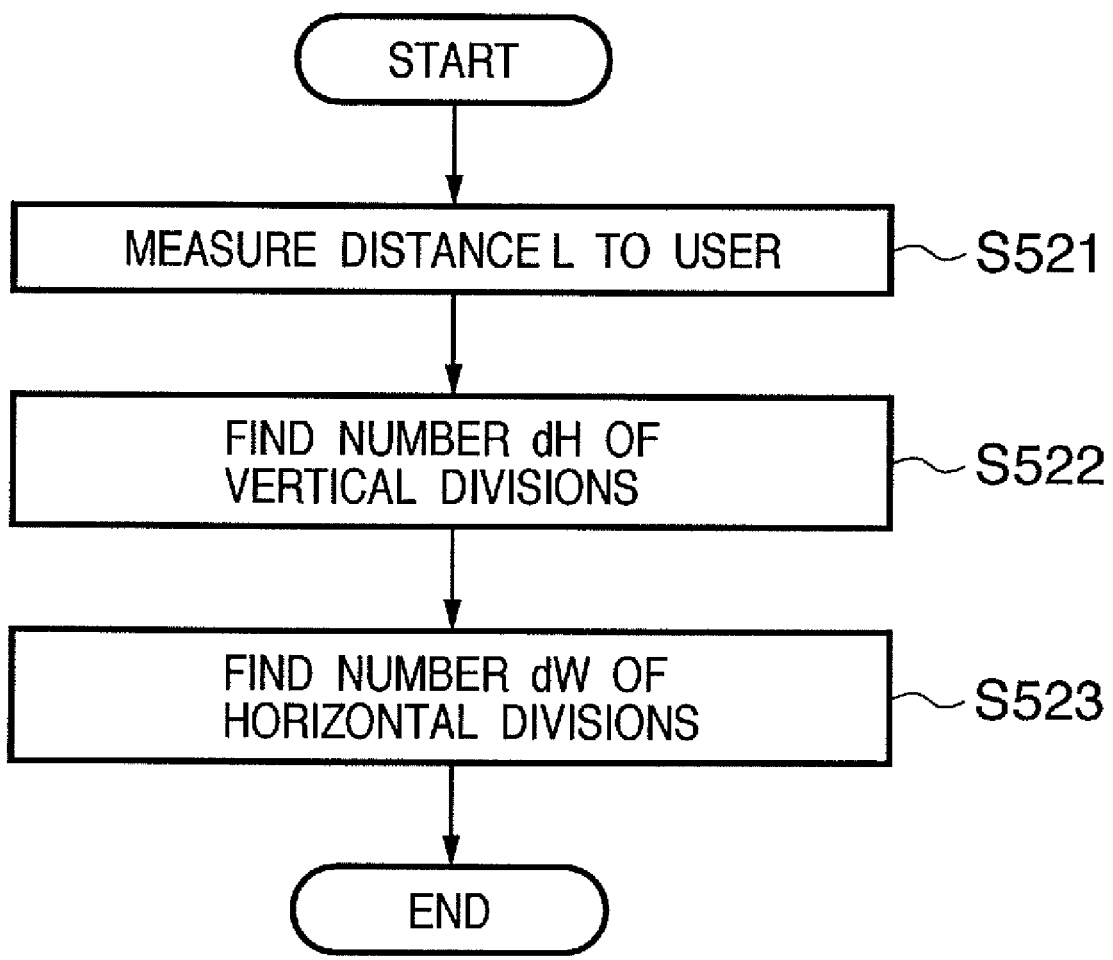
FIG. 15 is a flowchart illustrating processing for obtaining a number of divisional areas in the fourth embodiment.

FIG. 15 is a flowchart illustrating processing for obtaining a number of divisional areas based upon user viewing distance. This processing replaces the processing of steps S502, S503 illustrated in FIG. 5. At step S521, the distance sensor 205 measures the distance between the user 701 and the display screen 201 and stores the measured value in a variable L. Then, at step S522, the number dH of divisions in the height direction of the display area is found from the value of the variable L and information concerning the display screen 201 (the display area size acquired at step S501). This is followed by step S523, at which the number dW of divisions in the width direction of the display area is found from the value of the variable L and information concerning the display screen 201 (the display area size acquired at step S501). Processing from step S504 onward in FIG. 5 is executed using these numbers of divisions.

It should be noted that it will suffice to adopt an arrangement in which a table in which various distances L, display area sizes and numbers of divisions to be set have been registered is prepared and the numbers of divisions in the height and width directions are found by referring to this table at steps S522 and S523. The following is an example of specific numerical values in the case of a size-36 screen (1280 pixels in the width direction and 720 pixels in the height direction):

| DISTANCE L (M) | NUMBER dH OF VERTICAL DIVISIONS | NUMBER dW OF HORIZONTAL DIVISIONS |
| --- | --- | --- |
| LESS THAN 1.8 | 2 | 3 |
| EQUAL TO OR GREATER THAN 1.8 AND LESS THAN 3.0 | 3 | 5 |
| EQUAL TO OR GREATER THAN 3.0 | 4 | 7 |

Further, when the value of radius R described in the second embodiment is decided, it is possible to measure the distance between the user 701 and the display screen 201 of the large-screen TV 101 by the distance sensor 205 and decide the value of radius R based upon this distance. The following is an example of specific numerical values in the case of a size-36 screen (1280 pixels in the width direction and 720 pixels in the height direction):

| DISTANCE L (m) | RADIUS R |
| --- | --- |
| LESS THAN 1.8 | 120 |
| EQUAL TO OR GREATER THAN 1.8 AND LESS THAN 3.0 | 100 |
| EQUAL TO OR GREATER THAN 3.0 | 80 |

Fifth Embodiment

Instances where viewability declines depending upon the size of the display area and user preference are conceivable even in a case where a plurality of moving images are laid out is dispersed form as illustrated in FIGS. 4, 9 and 12. Accordingly, the fifth embodiment is such that in a case where specific moving image data has been specified by user operation, the specified moving image data is reproduced in standard fashion and the other items of moving image data are reproduced in slow motion. As a result, a plurality of items of moving image data are displayed in array form without sacrificing user viewability.

Figure 16:
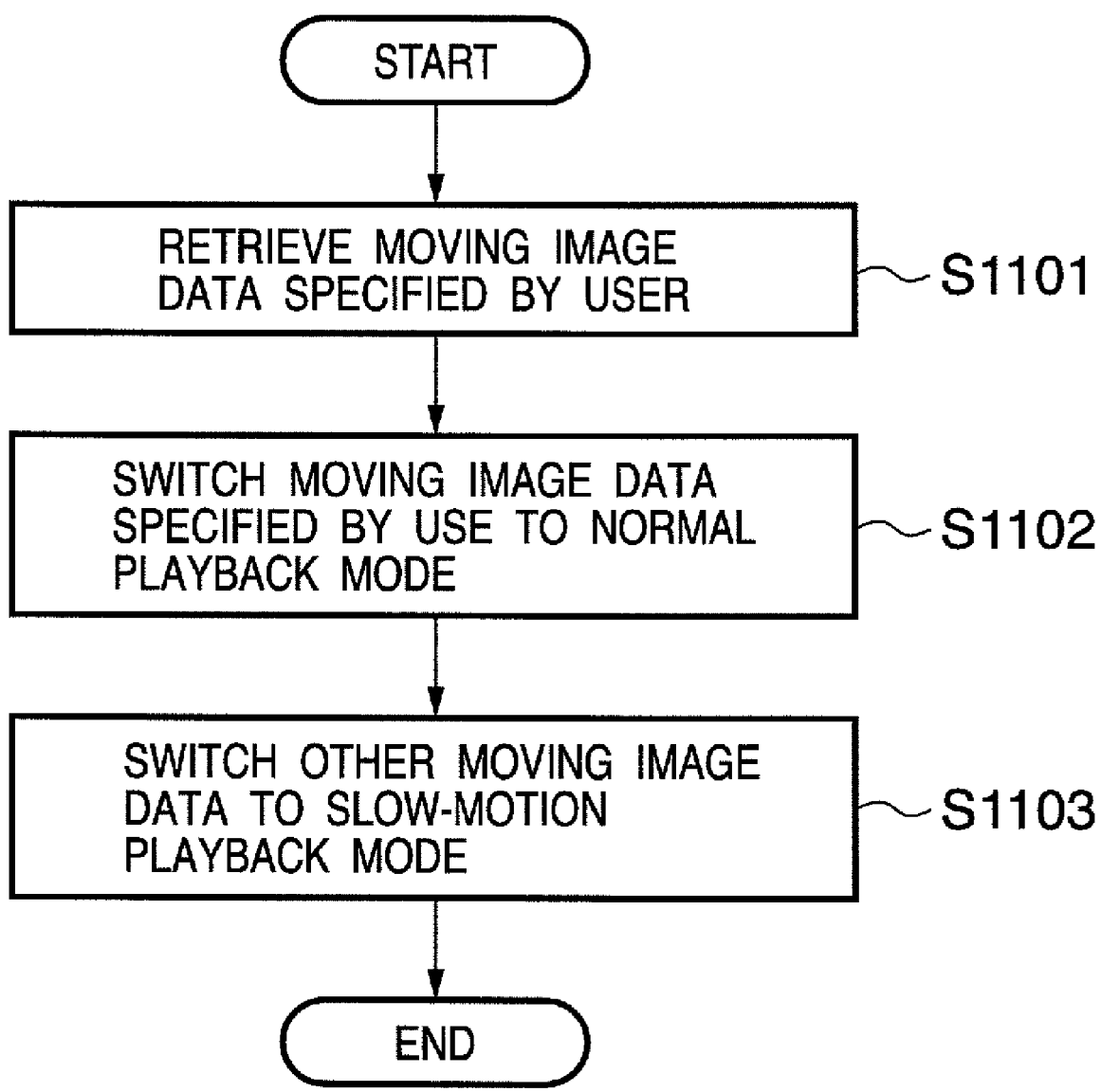
FIG. 16 is a flowchart illustrating processing for ordinary playback solely of a specific image in a fifth embodiment of the present invention.

FIG. 16 is a flowchart illustrating processing in a case where a moving image has been specified. This is processing for reproducing the specified moving image in normal fashion and reproducing other moving images in slow motion. This processing is executed by the display control unit 20 after a list display has been presented by the processing of each of the foregoing embodiments.

At step S1101, the display control unit 20 retrieves moving image data that has been selected by the user from the image data list that is the object of the list display. Next, at step S1102, the display control unit 20 performs playback of the moving image data retrieved at step S1101 in the normal playback mode. Then, at step S1103, the display control unit 20 performs playback of moving image data other than the moving image data retrieved at step S1101 in the slow-motion playback mode.

As described above, each of the foregoing embodiments is such that in a case where a plurality of items of image data are displayed collectively on one display screen and a plurality of items of moving image data exist in the image data, display positions can be decided in such a manner that reproduction can be performed simultaneously without detracting from the identifiability of each item of moving image data. That is, by placing each moving image by the image display method of the foregoing embodiments, it is possible to enhance user viewability and retrievabillity for identifying each item of image data even in a case where a plurality of moving images are reproduced simultaneously.

In the foregoing embodiments, a case where a list display is presented in a form where some images partially overlap has been described. However, it is obvious that the present invention is also applicable to a list display in which images are displayed upon being aligned vertically and horizontally. Further, the coordinates of each display position in FIG. 3C have been registered in advance. However, it may be so arranged that the coordinates of display positions of each of the images are generated whenever necessary as by utilizing random numbers.

Further, application of the present invention to a large-screen TV is illustrated in the foregoing embodiments. However, the present invention is also applicable to applications operating in personal computers, mobile computers or the like, that deal with moving image data. Also, the present invention is applicable to other household electrical appliances that handle moving image data.

Further, the entire display screen 201 is adopted as the area of the list display in the foregoing embodiments. However, it may be so arranged that the area of the list display is delimited by a so-called window. In such case the display area size acquired at step S501 or S801 would be the size of the window that presents the list display.

The present invention covers cases where the functions of the foregoing embodiments are achieved by supplying a software program directly or remotely to a system or apparatus, reading the supplied program codes with a computer of the system or apparatus, and then executing the program codes. In this case, the supplied program is a program corresponding to the flowcharts illustrated in the drawings of the embodiments.

Accordingly, since the functions of the present invention are implemented by computer, the program codes per se installed in the computer also implement the present invention. In other words, the present invention also covers a computer program per that is for the purpose of implementing the functional processing of the present invention.

In this case, so long as the system or apparatus has the functions of the program, the form of the program, e.g., object code, a program executed by an interpreter or script data supplied to an operating system, etc., does not matter.

Examples of recording media that can be used for supplying the program are a Floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program of the present invention can be downloaded to a recording medium such as a hard disk from the website. In this case, program downloaded may be an automatically installable compressed file. Further, the program of the present invention can be supplied by dividing the program code constituting the program into a plurality of files and downloading the files from different websites. In other words, a WWW (World Wide Web) server that downloads, to multiple users, the program files that implement the functional processing of the present invention by computer also is covered by the present invention.

Further, it is also possible to encrypt and store the program of the present invention on a storage medium such as a CD-ROM and distribute the storage medium to users. In this case, users who meet certain requirements are allowed to download decryption key information from a website via the Internet and run the encrypted program by using the key information, whereby the program is installed in the computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, the program read from the recording medium may be written to a memory provided on a function expansion board inserted into the computer or provided in a function expansion unit connected to the computer, and some or all of the functions of the embodiments may then be implemented. In this case, after the program has been written to the function expansion board or function expansion unit, a CPU or the like mounted on the function expansion board or function expansion unit performs all or a part of the actual processing based upon indications of the program.

In accordance with the present invention, if a plurality of items of moving image data are displayed in the form of an array, the positions at which the moving image data are reproduced are decided appropriately to enhance viewability by the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-264435, filed on Sep. 12, 2005, which is hereby incorporated by reference herein in its entirety.

What is claimed is:

1. An image display method of displaying a plurality of items of moving image data on a screen, comprising the steps of:
  determining a virtual radius of a circular display area displaying one item of moving image data;
  determining display positions of the plurality of items of moving image data on the screen such that another item of moving image data is not displayed within a circular display area having the determined radius centered at a display position of one item of moving image data; and
  displaying each of the plurality of items of moving image data at display positions on the screen determined in said determining step.

2. The method according to claim 1, further comprising a step of measuring distance between the screen and a user,
  wherein virtual radius is determined based on the measurement distance.

3. The method according to claim 1, further comprising a step of exercising control at playback of the moving image data so as to reproduce moving image data, which has been specified by the user, at normal speed and reproduce other moving image data at slow speed.

4. The method according to claim 1, wherein in said step of determining the virtual radius, the radius is determined based on a size of the screen.

5. An image display apparatus for displaying a plurality of items of moving image data on a screen, said apparatus comprising:
  a first determining unit adapted to determine a virtual radius of a circular display area displaying one item of moving image data;
  a second determining unit adapted to determine display positions of the plurality of items of moving image data on the screen such that another item of moving image data is not displayed within a circular display area having the determined radius centered at a display position of one item of moving image data; and
  a display unit adapted to display each of the plurality of items of moving image data at display positions on the screen determined by said second determining unit.

6. The apparatus according to claim 5, further comprising a measuring unit adapted to measure distance between the screen and a user,
  wherein, said first determining unit determines the radius based on the measurement result of said measuring unit.

7. The apparatus according to claim 5, further comprising a reproduction control unit adapted to exercise control at playback of the moving image data so as to reproduce moving image data, which has been specified by the user, at normal speed and reproduce other moving image data at slow speed.

8. The apparatus according to claim 5, wherein said first determining unit determines the radius based on a size of the screen.

9. A non-transitory computer readable medium storing a control program for causing a computer to execute an image display method comprising the steps of:
  determining a virtual radius of a circular display area displaying one item of moving image data;
  determining display positions of the plurality of items of moving image data on the screen such that another item of moving image data is not displayed within a circular display area having the determined radius centered at a display position of one item of moving image data ; and
  displaying each of the plurality of items of moving image data at display positions on the screen determined in said determining step.

* * * * *